(12) United States Patent
Clark

(10) Patent No.: US 6,965,634 B1
(45) Date of Patent: Nov. 15, 2005

(54) NON-STATIONARY DITHER CODE GENERATION AND DETECTION

(75) Inventor: James M. Clark, Verona, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 873 days.

(21) Appl. No.: 09/711,179

(22) Filed: Nov. 13, 2000

Related U.S. Application Data

(60) Provisional application No. 60/164,952, filed on Nov. 12, 1999, provisional application No. 60/164,951, filed on Nov. 12, 1999.

(51) Int. Cl.$^7$ ................................................. H04B 1/69
(52) U.S. Cl. ...................... 375/150; 375/147; 375/149; 370/342; 370/324; 370/442
(58) Field of Search ................................ 375/150, 147, 375/149; 370/342, 442, 370

(56) References Cited

U.S. PATENT DOCUMENTS 6,370,134 B1 * 4/2002 Aramaki ...................... 370/342
6,480,504 B1 * 11/2002 Wang et al. ................. 370/442

OTHER PUBLICATIONS

Higuchi, Fast Cell Search Algorithm in Ds-CDMA Mobile Radio Using Long Spreading Codes, 1997, IEEE, 47th, vol.: 3, p.: 1430-1434.*
Wheatley, C.; CDMA's dependence on good timing and related issues,1996. 50th., Proceedings of Wheatley, C.; CDMA's dependence on good timing and related issues,the 1996 IEEE International. , Jun. 5-7, 1996, pp.: 1211-1218.*
Spilker, Jr., J.J. "GPS Signal Structure and Performance Characteristics", pp. 29-54, Global Positioning System, The Institute of Navigation, vol. 1, 1980.
Glazer, B.G., "GPS Receiver Operation", pp. 81-86, Global Positioning System, The Institute of Navigation, vol. 1, 1980.
Winch, Robert G., Telecommunication Transmission System (Second Edition), Copyright 1998, 1993 by McGraw-Hill, pp. 128-135.
Ananda, M.P., et al., Satellite Navigation Systems, Autonomous Navigation of the Global Positioning System Satellites, McGraw-Hill Encyclopedia of Science and Technology, pp. 53-59, 1986.
Ananda, M.P. et al., Autonomous Navigation of the Global Positioning System Satellites, The AIAA Guidance and Control Conference, Aug. 20-22, 1984, pp. 1-11.

* cited by examiner

*Primary Examiner*—Shuwang Liu
*Assistant Examiner*—Eva Zheng
(74) *Attorney, Agent, or Firm*—Edell, Shapiro & Finnan, LLC

(57) ABSTRACT

A detector receives a signal and detects from it a long code composed from shorter codes, where the shorter codes are dithered according to a non-repeating dither pattern. The received signal is correlated with a reference code, the correlation sums are ranked, and short codes detected from the ranked sums. Because of a high jamming to signal (J/S) ratio, all the transmitted short codes may not be detected. A dither matching algorithm determines an interval between the detected codes and matches it with a previously stored dither pattern. If there is a strong match, the correlation sums and respective receive times are stored in a hypothesis data structure. If enough subsequent correlation pair have similar matches to exceed a threshold, the match is declared correct and the results are output. The time difference between received and matched pairs can be a measure of a pseudorange between transmitter and receiver.

35 Claims, 6 Drawing Sheets

| | (−1) | (+1) | (+1) | (−1) |
|---|---|---|---|---|
| BOUNDARY DITHER: | 0 0 1 0 1 | 1 0 0 1 1 | 1 0 0 1 1 | 1 0 0 1 0 1 |

| | (0) | (−1) | (0) | (+1) |
|---|---|---|---|---|
| ROTATION DITHER: | 0 0 1 0 1 | 1 0 1 1 | 0 0 1 1 | 1 0 0 1 0 1 |

ALIGNED REFERENCE CODES: 0 0 1 0 1 | 1 0 0 1 1 | 1 0 0 1 1 | 1 0 0 1 0 1

FIG.3A  FIG.3B  FIG.3C

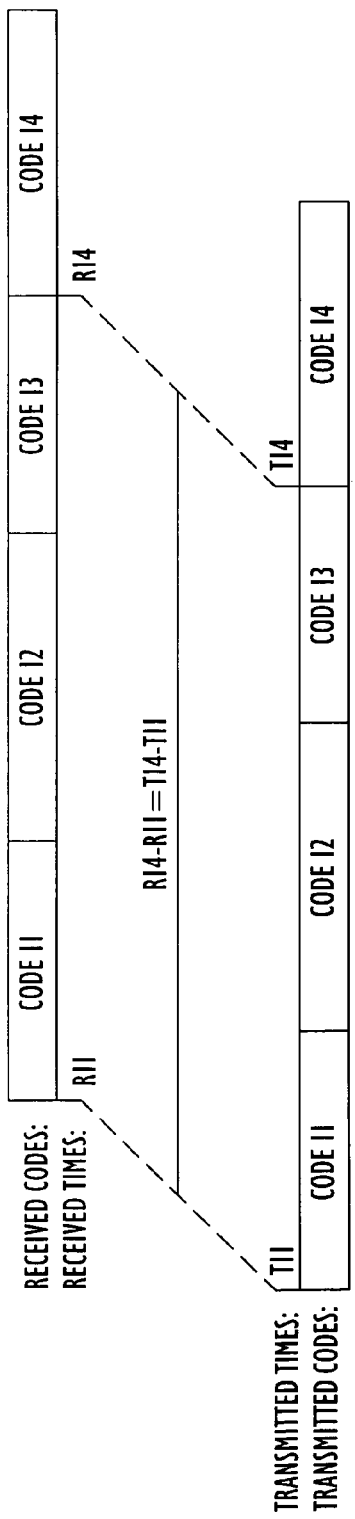
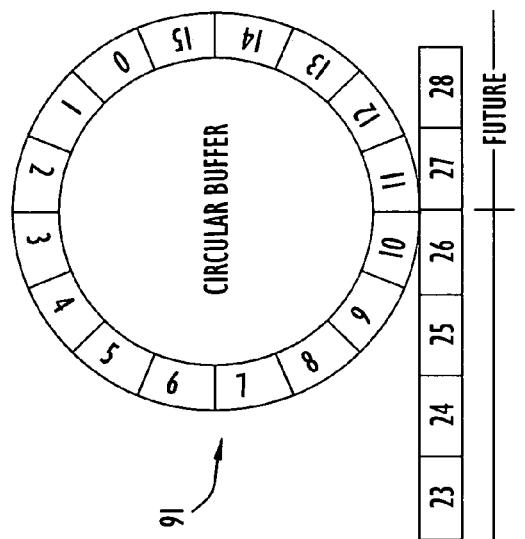
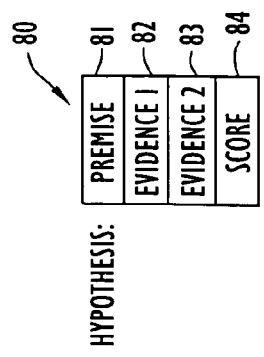
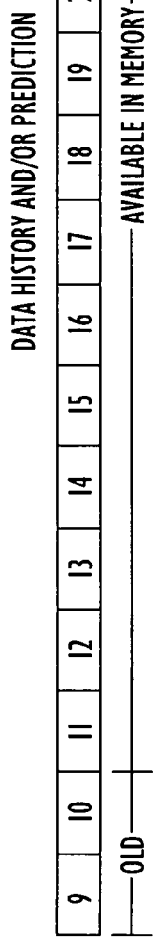
FIG.7
FIG.8
FIG.9

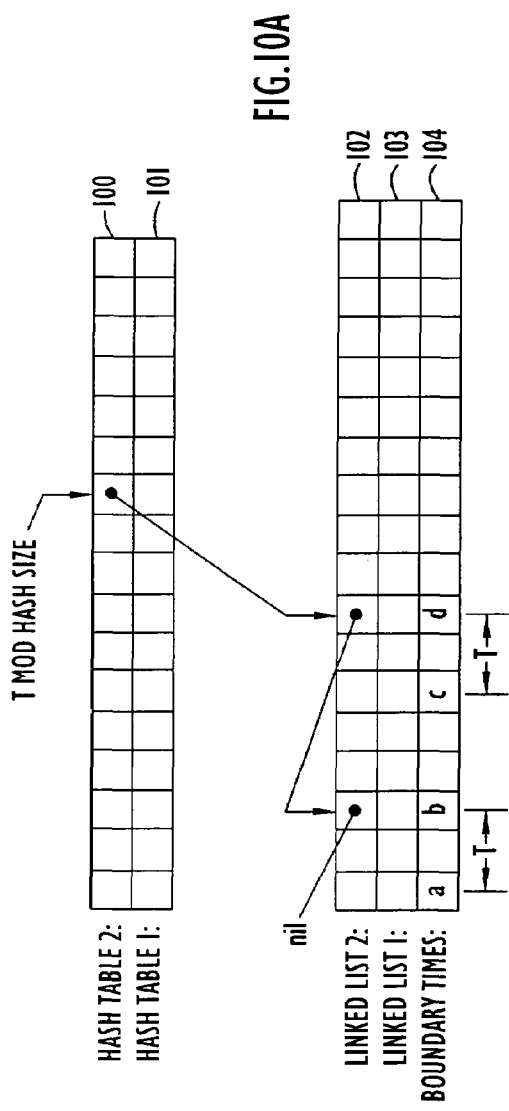
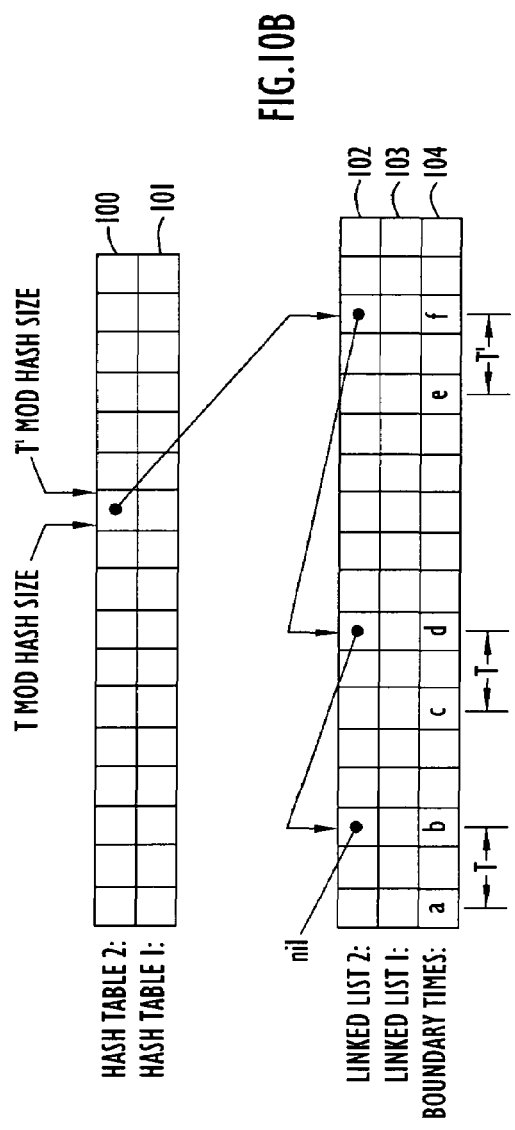

NON-STATIONARY DITHER CODE GENERATION AND DETECTION

CROSS REFERENCE TO RELATED APPLICATION

This application claims priority from U.S. Provisional Patent Application Ser. Nos. 60/164,951, entitled "Non-stationary Dither Code Detection," and 60/164,952, entitled "Optimal Stationary Dither Code," both filed Nov. 12, 1999. The disclosures of those provisional patent applications are incorporated herein by reference in their entirety.

BACKGROUND OF THE INVENTION

1. Field of the Invention

The present invention relates to data communication systems and, more particularly, to data communication systems using codes with coding boundaries that vary according to a dithering pattern.

2. Description of the Related Art

Pseudo-noise (PN, or pseudorandom) codes are ideal for ranging, that is, measuring the time-of-arrival of a signal, in noisy conditions, including jamming noise, because of the high coding gain and fine timing resolution that can be achieved using PN codes. There are occasions where the timing information in such a signal is to be denied to hostile or unauthorized receivers. Although, at the same time it is necessary for authorized receivers to have access to that timing information. The signal also must provide jam-resistant performance for authorized receivers. Conventional methods of transmission do not satisfy both requirements of selectively providing timing information only to authorized receivers and providing those receivers with jam-resistant performance for the following reasons.

A high coding gain implies that the code needs to be correlated for a long time, but for fast acquisition, there should not be too many possible phase positions to be searched. These two factors imply that the code needs to be repeated during the correlation time. However, repeating the code implies that some code structure will be observable by an unauthorized receiver. Conventional repetition of a code will reveal some timing information to unauthorized receivers that could be used to acquire further information from the transmission system, and could compromise its security.

For example, in the Global Positioning System (GPS), a non-repeating encrypted data stream, known as the "Y code", is used to deny timing information to unauthorized receivers. However, there are so many possible phase positions to be searched in the Y code that a separate signaling system using the Coarse Acquisition "C/A" code is needed to aid the signal detection.

A simplified diagram of a GPS transmitter 1 and receiver 9 is shown in FIG. 1. The transmitter includes a PN code generator 2 that is controlled by a timing counter 3 and both are driven based on a clock oscillator 4. The PN code generated by generator 2 is modulated with a carrier signal via modulator 5 which is driven by carrier oscillator 6. Optionally, data can be superimposed onto the code and carrier by using a modulo 2 adder 7. To deny access to the GPS timing and navigation information and signals, the Y code is generated with a non-repeating data stream, as indicated above. Although not shown in FIG. 1, the PN code generator 2 would have the PN code encrypted according to an encryption algorithm that requires a secret key to decode.

The transmitter 1 transmits the modulated, and in this case encrypted, carrier via antenna 8 to a receiver 9.

The receiver 9 receives the transmitted signal via an antenna 10 that provides the received signal to a demodulator 11. The demodulator 11 is driven by a carrier oscillator 12, and produces two signals out-of-phase by 90°. Those signals are designated as in-phase (I) and quadrature (Q) signals. These two out-of-phase signals are provided to a group of parallel correlators 13. The parallel correlators can include as many, and even more, correlators as the number of phases of the code to be tested. For example, if the code length is 1023 symbols, or chips, the parallel correlators 13 can consist of 1023 correlators, with one correlator for each possible phase of the code. Multiple banks of the parallel correlators 13 can be used to correlate different signals, such as in this case where one bank correlates the I-signals and another bank correlates the Q-signals. The parallel correlators 13 are also provided with PN reference codes that correspond to the PN codes generated in the transmitter. Here, in order to use the Y code, the receiver's PN code generator 14 must have the decryption key, corresponding to the encryption key used by the transmitter to encrypt the signal. The PN code generator 14 generates the reference codes. A typical PN generator is shown in FIG. 2, where a shift register 20 generates the PN code using adder 21 and feed back into the shift register.

The reference codes can be delayed to correspond to the various phases to be tested. Alternatively, the input signals, here the I and Q signals, can be delayed with various delays and correlated with a single PN code to test the different phases. The PN code generator 14 is driven by a local clock oscillator 15 and timing counters 16 which can produce the different timings for the PN reference codes. The local clock oscillator also drives timing counters 16.

The GPS receiver 9, shown in FIG. 1, requires two PN code generators. One of the PN generators, similar in concept to the generator shown in FIG. 2, generates the P code and another, also similar to that shown in FIG. 2, generates the C/A code. Although only one generator is shown in the FIG. 1 it will be understood that in the case of a long code system, such as GPS, two generators are used. Also, the receiver, in the threshold detection function 17, must be able to detect both the P and C/A codes.

Consequently, conventional spread-spectrum receivers, such as GPS receivers, suffer from the problems described above and are unable to detect a long non-repeating code without the aid of a second timing signal. Accordingly, there is a need for a long non-repeating code that can be acquired by an authorized receiver without the need for first detecting a second, assisting, timing signal.

SUMMARY OF THE INVENTION

Therefore, in light of the above, and for other reasons that become apparent when the invention is fully described, an object of the present invention is to generate a long non-repeating code that can be acquired by an authorized receiver without also relying on first acquiring another code to assist in acquiring the long code signal.

A further object of the present invention is to receive a long non-repeating code that has the beneficial properties of a short code.

Yet a further object of the present invention is to receive a coded signal over a communication medium where there is a high jamming to signal (J/S) ratio, and only if the receiver is authorized to receive the coded signal.

A still further object of the present invention is to quickly match a measured code interval with a predetermined code interval.

Another object of the present invention is to maintain a linked list of information without requiring a garbage collection function.

The aforesaid objects are achieved individually and in combination, and it is not intended that the present invention be construed as requiring two or more of the objects to be combined unless expressly required by the claims attached hereto.

In accordance with the present invention, a transmitter will generate a code that allows some code features to be repeated, allowing an authorized receiver acquire some timing information quickly. However, this timing is random, so that if an unauthorized receiver also obtains it, it is meaningless. The authorized receiver has secret data that enables the random timing to be related to ordinary clock time.

In accordance with another aspect of the invention, a method of updating a linked list uses time indexes that are modulo incremented and an old index value instead of using pointers, where array information is stored in a circular buffer and the old index value is updated to manage an end of the list.

The above and still further objects, features and advantages of the present invention will become apparent upon consideration of the following descriptions and descriptive figures of specific embodiments. While these descriptions go into specific details of the invention, it should be understood that variations may and do exist and would be apparent to those skilled in the art based on the descriptions herein.

BRIEF DESCRIPTION OF THE DRAWINGS

FIG. 3A shows an example boundary dither code.

FIG. 3B shows an example rotation dither code.

FIG. 3C shows an example reference code used to generate the boundary dither and rotation dither codes shown in FIGS. 3A and 3B.

FIG. 7 is a timing diagram showing code matching between transmitted and received codes, according to the invention.

FIG. 8 shows a data structure of hypothesis data stored in the hypothesis data buffer shown in FIG. 5.

FIG. 9 is a conceptual diagram illustrating the operation of a circular buffer employed in embodiments of the invention.

FIGS. 10A–B are diagrams showing hash tables for organizing dither timing data, according to the invention.

DESCRIPTION OF THE PREFERRED EMBODIMENTS

Figure 1:
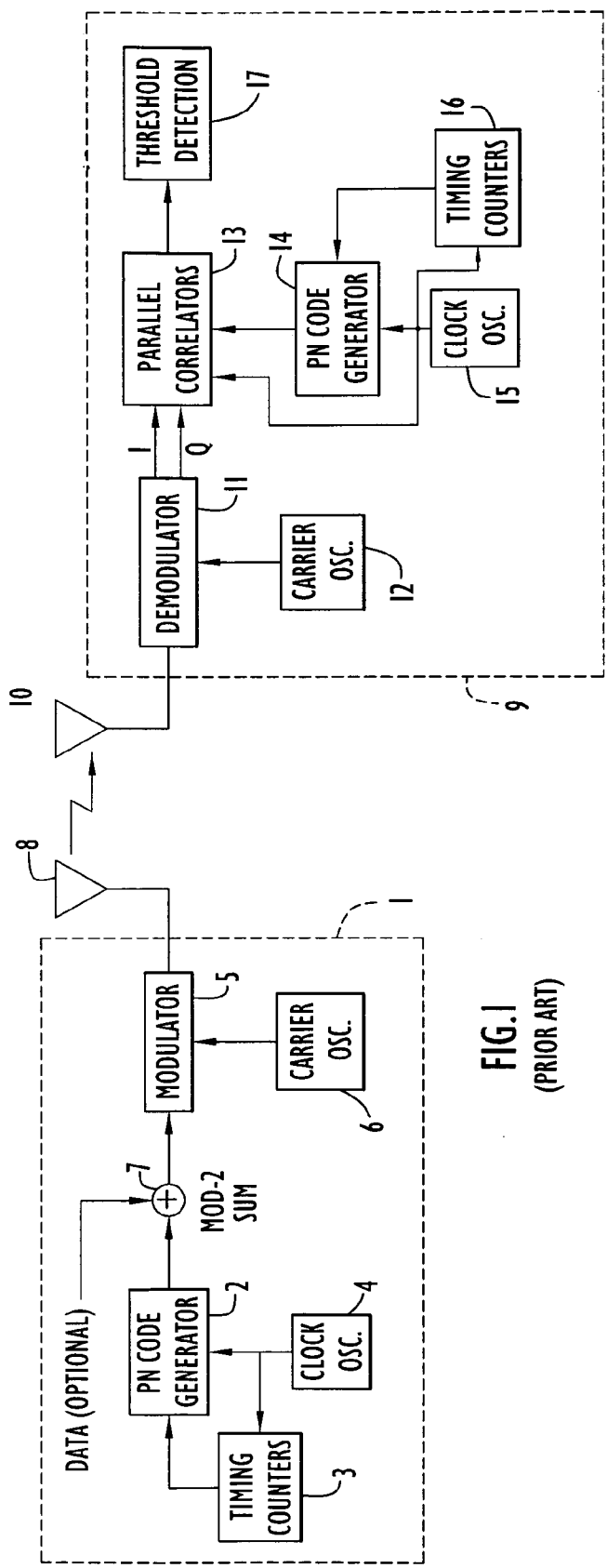
FIG. 1 is a block diagram of a conventional spread-spectrum communication system.
Figure 2:
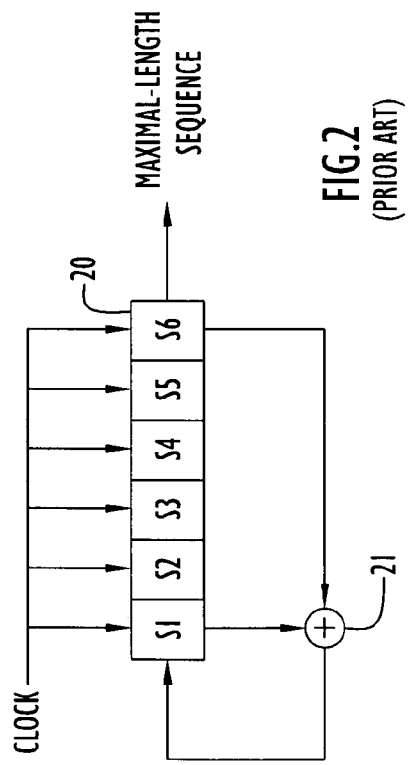
FIG. 2 shows a conventional pseudonoise generator.

Preferred embodiments according to the present invention are described below with reference to the above drawings, in which like reference numerals designate like components.

Overview

This present invention uses non-stationary dither codes. In contrast, two copending applications entitled "Method And Apparatus For Generating And Transmitting a Stationary Dither Code" and "Method and Apparatus for Detecting a Stationary Dither Code," which are incorporated herein by reference, describe stationary dither codes. However, those copending application describe stationary codes, and accordingly, stationary codes are described here only briefly.

Throughout the following description data values and certain parameters are indicated by a compound words formed with no space between the words. For example, "CodeLen" is a data value referring to the length of the a PN code.

Code Structure

In designing the signal structure for a communications system according to the invention, a code that is CodeLen chips (bits) long with good autocorrelation properties will be chosen. That code is referred to here as a reference code. The reference code is typically very long (such as a million bits, with dither variations on the order of thousands of bits), and may be constructed of shorter codes.

To form a long code the reference code is repeated. But so that one instance of the reference code can be distinguished from another, each repetition of the code is dithered, that is, its timing is varied in ways that will be described next. The varied copies of the reference code are referred to here as dither codes. The copending applications mentioned above describe methods of constructing long code from shorter codes using a fixed, repeating dither pattern. Such a dither pattern is referred to as a stationary dither pattern because the pattern is fixed and repeats. In that context, the reference code is used to refer to an undithered short code.

Here, the dither pattern is non-repeating; thus it is referred to as a non-stationary dither pattern. One reason for using non-stationary dither is for security, because it will not be predictable for unauthorized receivers. Another reason for using a non-stationary dither pattern is that for authorized receivers the pattern will be associated with the receiver's clock time.

One kind of dither, referred to here as boundary dither, is created by varying the lengths of the codes by relatively small amounts. All of the codes start the same way, but bits are added or deleted at the ends of the codes. The boundaries between the codes are thus not equally-spaced, but varied by some pattern referred to as a dither code.

Another kind of dither, referred to as rotation dither, is created by rotating the codes, keeping the length constant. That is, the codes are varied by starting them in varying states. The boundaries between the codes are thus equally-spaced, but the phase of the codes can be different. There remains one feature in common with the boundary dither: if the dithered code is compared with an undithered code, the code phase of the dithered codes will shift back and forth in some pattern.

FIGS. 3A–C illustrate the two types of dither with a small-scale example, in which a 7-bit code shown in FIG. 3C is repeated four times. Dithering the 7-bit reference code by the boundary dither method varies the lengths of the codes. The codes marked in FIG. 3A as (−1) are one bit shorter, and those marked (+1) are one bit longer than the reference code.

Dithering the 7-bit reference code by the rotation dither method shifts the codes. The codes marked in FIG. 3B as (−1) are rotated one bit to the left, those marked (+1) are rotated one bit to the right, and those marked (0) are not rotated.

For either type of dither, a receiver can generate a reference code (an unmodified 7-bit code) and find phase shifts of the reference code that are aligned with the received codes, as illustrated in FIG. 3C. The aligned reference codes and received codes will match almost entirely, except for a few bits at the ends of the codes, and thus, will produce a strong correlation. Accordingly, a long code with a long period can be generated using only a single, short reference code.

The embodiments of the inventions discussed below are described in terms of boundary dither. However, other types of dither, such as boundary dither may be used.

Non-Stationary Dither Code Transmitter

In an embodiment of the invention, a transmitter sends pseudonoise (PN) codes that are nominally CodeLen chips long. Those codes are identical except that the length is varied with an endless random pattern that is secret and known only to authorized receivers. It is assumed that the transmitter and the authorized receivers have a secret method, or a method that depends on secret data, to derive the random pattern from clock time. Here, all of the codes start at the same place in the pseudonoise pattern, so that only the ends of the codes vary.

Figure 4:
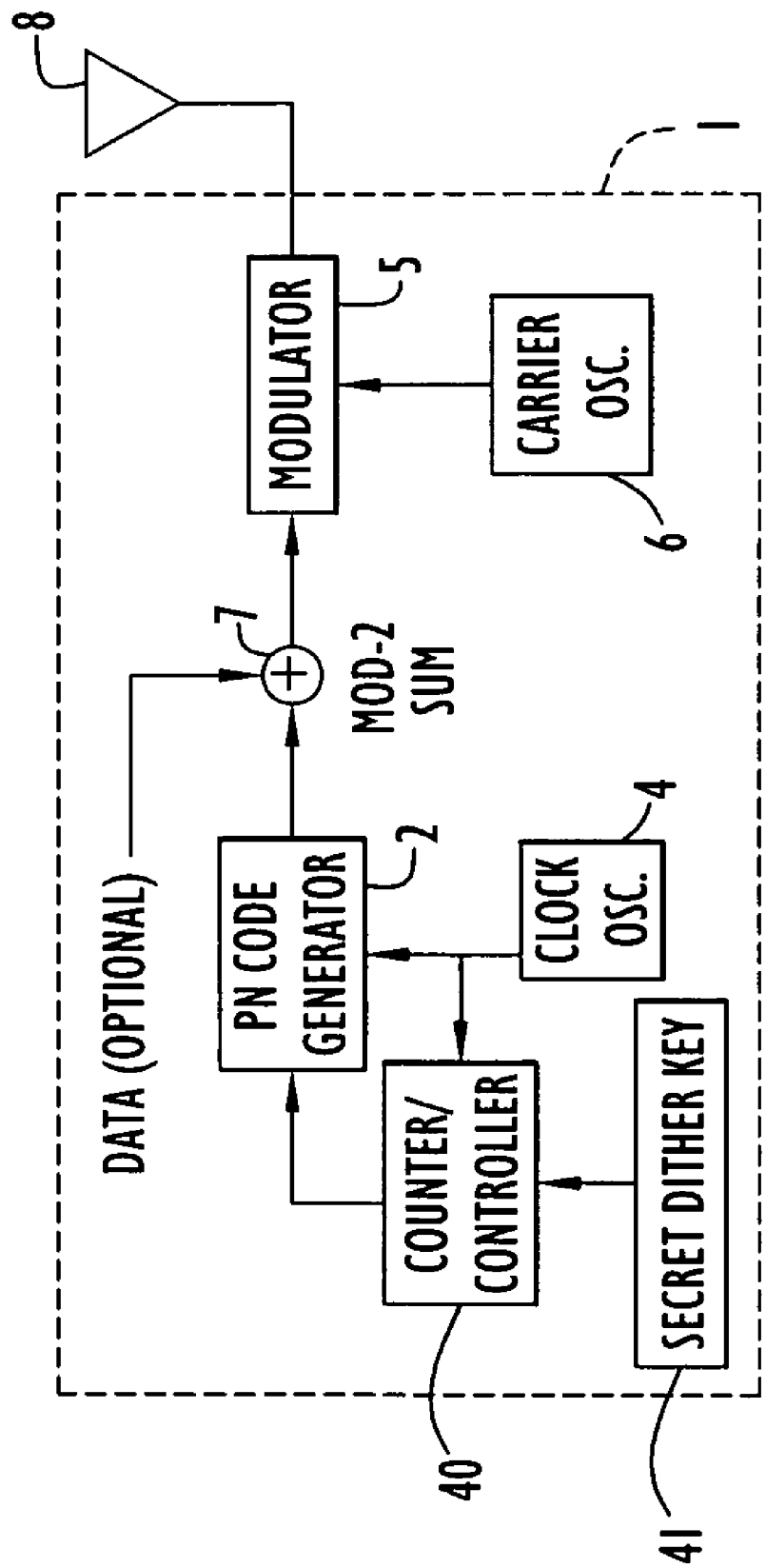
FIG. 4 is a block diagram of a transmitter according to one embodiment of the invention.

A transmitter 1, according to the present embodiment of the invention is shown in FIG. 4. Here, the elements of the transmitter are the same as the like numbered elements in the conventional transmitter shown in FIG. 1, except the timing counters 3 is replaced with counter/controller 40 and secret dither key 41. Here, the counter/controller 40 generates a non-repeating dither pattern based on the secret dither key 41. The counter/controller 40 controls the PN code generator 2 to generate a dithered PN code that is dithered based on the secret dither key 41 and that does not repeat. This non-repeating dither code, referred to here as a non-stationary dither code, is broadcast by the transmitter for use by authorized receivers.

Detection Strategy

The receiver 9 can align a reference code, generated locally with its PN code generator 14, with the received signal and detect alignment by correlating the reference code and the received signal. Many phase positions of the reference code must be tried, and only positions very closely aligned with the received signal will obtain a strong correlation. By rotating the reference code in one-half chip increments, CodeLen*2 phase positions are tested. At least one of those positions will be nearly or perfectly aligned, and nearby positions may also be partly aligned.

For example, if one position is perfectly aligned, resulting in a maximum correlation amplitude, the positions one-half chip before and after will correlate at ¼ power; and if the perfect alignment falls half-way between two positions, then the nearby positions will correlate at $1/16$, $9/16$, $9/16$, and $1/16$ power.

When an aligned code is detected, the receiver has effectively measured the time of arrival of a code boundary, that is, the start of the correlated code, relative to its local timing, with the precision of one-half of a chip. The reference code phase positions are identified in terms of local timing. If the receiver also measures the time of arrival of the following code boundary, it has measured the length of the code received between those boundaries.

However, because the lengths of the transmitted PN codes randomly vary in a non-stationary dither code, and the number of possible lengths is large compared to the number of codes received during the time uncertainty window of the receiver, the measured code length will usually match only one of the code lengths that the receiver knows will occur close to its current time. This knowledge comes from the secret endless random pattern mentioned earlier. In this case of receiving a non-stationary dither code, the receiver can compute the difference between the measured time of arrival and the expected (according to local timing) time of arrival. Since the time of arrival at the receiver is the time of transmission plus transmission path delay, the receiver can determine the pseudorange: that is, the path delay plus the difference between the transmitter's and the receiver's timing. If the measured code length matches more than one of the code lengths that the receiver knows will occur, then there will be multiple solutions; but in any case, a final solution is not declared until some number of simple solutions agree.

When the jamming to signal (J/S) power ratio is high, and thus aligned codes are difficult to detect, the receiver may not detect successive code boundaries. Rather, the receiver may only be able to detect code boundaries that are separated by a Span of (for example) five code periods. That is, consider the situation where the receiver detects the beginning of a first code, but because of a high J/S power ratio, does not detect that first code's ending boundary and also does not detect the end boundaries of the next three codes, but finally detects the end boundary of the fifth code. In this instance the difference between the detected code boundary arrival times is the measured length of five successive codes, and hence, a Span of five. By summing the code lengths that the receiver knows will occur close to its current time, five at a time, the receiver can list possible values for five-code measurements, and where these five-code groups start in the secret sequence. With this secret information the receiver can match the measured length to one of the values in this list, and obtain a solution as described before.

Before starting to process the received signal, the receiver will prepare lists of code boundary differences (i.e., code lengths) for various Span values from one to SpanSize, covering the current time uncertainty window. These lists, also called "a prioriwindow data" can only be prepared with the secret knowledge that is available only to authorized receivers. These lists are pre-sorted for fast searching, using a hashing method. As time advances, new data is added to the lists and old data is deleted from the lists, while keeping the data sorted, thus keeping the window data current for the current local time.

Detector Architecture

A non-stationary dither code detector is described next with reference to FIG. 5. As indicated in that figure certain components, to the left of the dashed vertical line, are implemented in hardware, and other components, to the right of the line, are implemented in software. However, it will be understood by a person skilled in the art that many of the components in FIG. 5 can be implemented either in hardware or software, and the designation in FIG. 5 is but one example of demarcation between hardware and software functions.

Figure 5:
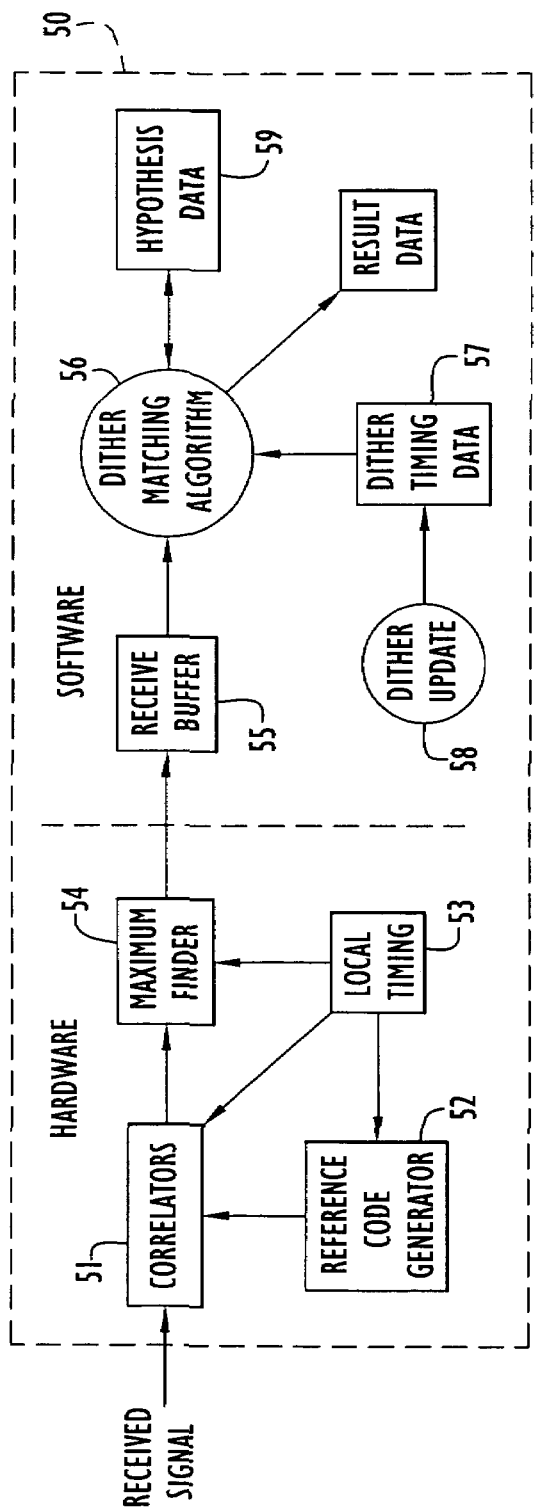
FIG. 5 is a block diagram of a receiver according to one embodiment of the invention.

A receiver, designed for receiving a non-stationary dither code, includes a non-stationary dither code detector 50, as shown in FIG. 5. The non-stationary dither code detector 50 includes correlators 51 that correlate a received signal with a reference code generated by reference code generator 52. A local timing unit provides the receivers local timing source to the units implemented in hardware, as shown in FIG. 5. A maximum finder unit 54 receives the correlation sums output from correlators 51, and arranges the sums in order of strength and provides the arranged sums to receive buffer 55. The receive buffer 55 stores the sums extracted from the maximum finder 54 by a dither matching unit 56. The dither matching unit 56 includes a dither matching algorithm that operates to create hypotheses about code times of arrival based on the sorted correlation sums provided by the maximum finder 54 and stored in the receive buffer 55. The dither matching unit 56 operates based on dither pattern information provided by dither timing data storage unit 57 and dither update unit 58 that stores the secret key. The dither matching unit 56 associates a score with each hypothesis it creates, and stores the hypotheses data in a hypothesis data buffer 59. When the dither matching unit 56 determines that a hypothesis' score exceed a threshold, it outputs a pseudorange estimate based on the hypothesis information. Next, the interoperation of each of the components shown in FIG. 5 is described.

The reference code generator 52 generates a reference code, and the correlators 51 compare many time-delays of the reference code to the received signal. The correlators 51 generally produce more correlation sums than the dither matching algorithm unit 56 can handle, but most of the sums are for unaligned (wrong) correlations. The aligned (correct) correlation sums are higher, on average, so the maximum finder, also referred to as a ranking list, is used to find the highest RSortSize correlation sums, in sorted order.

Figure 6:
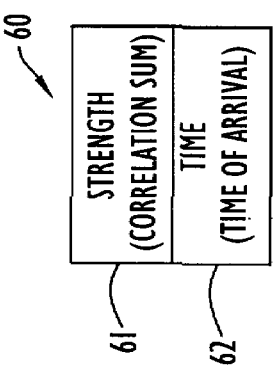
FIG. 6 shows a data structure for correlation data stored in the maximum finder shown in FIG. 5.

The maximum finder 54 sorts the correlations as they are produced, putting the strongest RSortSize correlations in a list. This list stores the 'strength' and received time of these correlations. The strength is the correlation sum. The received time, also called time tag, is the arrival time of the code boundary in terms of the local timing. FIG. 6 shows an exemplary correlation data structure 60 for storing the correlation sum 61, which indicates the correlation strength, and the time of arrival 62 of the code, or received time.

The received time is derived from the local time when the correlation sum is transferred from the correlators 31 to the maximum finder 54, which is typically one reference code length (nominal code length) after the beginning of the received code. Because the actual code length varies, the received time is typically close to, but usually not exactly, when the received code ends. The descriptions that follow explain how the received time is adjusted to the actual beginning of the received code.

When the ranking list is full, correlations weaker than the weakest correlation in the list are discarded; and when a new correlation is added to the list, the weakest correlation in the list is removed to make room for the new correlation. The dither matching unit 56 takes the strongest correlation from the ranking list to process, removing it from the list. This process increases the chances that aligned (correct) correlation sums will not be missed. The size of the maximum finder's ranking list, RSortSize, is generally set equal to the average number of correlations that the dither matching unit 56 can process per code period. Approximately, a smaller size diminishes performance, that is, speed and reliability of detection are diminished, but a larger size merely wastes hardware. Faster operation by the dither matching unit 56 allows for a larger RSortSize, which increases performance.

The maximum finder 54 is described in further detail in the copending application entitled "Method and Apparatus for Detecting a Stationary Dither Code."

The dither matching unit 56 reads the currently strongest correlation from the maximum finder 54, adds it to the receive buffer 55, and tries pairing this newest correlation with other correlations entered into the receive buffer 55 earlier. Whereas the maximum finder 54 sorts the correlations by strength, and keeps time tags attached to (associated with) the strength data, the dither matching unit 56 processes the correlations by the time tags (received times), and may optionally use the strength data to score (evaluate) the hypothesis data that is created and stored in hypothesis data buffer 59.

The dither matching unit 56 tries to match pairs of received times with pairs of transmission times obtained from the secret dither timing data. There is a match when the differences between corresponding boundary times are equal, as illustrated in FIG. 7. That figure shows the case in which the receiver has detected, through strong correlations, the codes labeled "code 11" and "code 14" in FIG. 7. Accordingly, the receiver knows, in terms of local time, the time R11 of the beginning of code 11, and the time R14 of the beginning of code 14. The dither matching algorithm, through its knowledge of the secret dither timing data, matches the measured span R14–R11 with a known span T14–T11. This match implies that R11–T11 (or, alternatively, R14–T14) is the pseudorange, that is, the signal transmission delay plus the difference between the transmitter's and the receiver's timing.

When a match is found, the data related to the match (called a hypothesis) is stored as a unit in the hypothesis data buffer 59. In this example application, the computed pseudorange of the hypothesis is called the premise of the hypothesis, and the pair of correlations used is called the evidence of the hypothesis. Each hypothesis also has a score, which is an estimate of the credibility of the hypothesis. One way of scoring is to sum the strengths of the evidence. FIG. 8 shows an example of such a hypothesis unit. A hypothesis data structure 80 is stored in hypothesis data buffer 59, and includes the premise data 81, evidence data, shown here as Evidence1 (82) and Evidence2 (83), and score data 84. Here, the computed pseudorange is recorded as premise 81, pairs of correlations corresponding to a match are recorded as the evidence (e.g., 82 or 83), and the calculated estimate of credibility is recorded as the score 84.

Each time a hypothesis created, the hypothesis data buffer 59 is searched to find if there are other hypotheses (e.g., matches) with the same premise (e.g., pseudorange), or similar premise, such as differing by only one-half of a chip period. This process allows for a small discrepancy due to Doppler shifting. The scores (e.g., the sum of the strengths of the correlations that produced matches) of the agreeing hypotheses (e.g., matches) can be combined to reflect the fact that the combined evidence supports the same conclusion—the same pseudorange estimate. Accidental hypotheses derived from unaligned correlations, or in other words, false evidence, will rarely agree.

The dither matching algorithm also updates the best combined score (e.g., sum of correlations) and the associated best premise (e.g., pseudorange), and when the best score reaches some threshold of confidence, the associated best premise is declared to be the final, reliable, pseudorange estimate, and is produced as the result data, as shown in FIG. 5.

But before the dither matching unit 56 can operate, the dither timing data must be generated. In this example, and most likely in practice, the transmitter has very accurate clock time and the receiver has imprecise clock time. The dither timing data describes the currently expected dither pattern, since it is informed via the dither update 58 of the secret dither information. It also must cover the range of possible receiver time errors, and allow for the range of possible signal transmission times, i.e., the distance between the transmitter and receiver. For example, if the receiver's clock (local timing) is only accurate to within ten seconds, then dither timing data must be generated for signal arrivals from ten seconds in the past, according to the local timing, to ten seconds in the future, according to the local timing. As time progresses, more future timing data needs to be generated and stored; and the oldest (past) data can be deleted to make room for the new data. This span of time is called the time uncertainty window; and the operation of redefining the past and future edges of the window, and updating the stored timing data accordingly, is called "sliding the window."

The dither update unit 58 initially fills the dither timing data storage unit 57 to cover the time uncertainty window, and operates periodically thereafter to update this data, that is, to 'slide the window'. The first part of this function is a cryptographic function that deterministicly generates a secret list of random numbers that specify the varying lengths of the dither codes. That process duplicates the same random numbers generated by the transmitter to control the dither code lengths. The numbers the dither update unit generates may express the actual lengths of the codes, such as in chips, or they may express the differences between the actual code lengths and the nominal code length. A second aspect of the dither update unit 58 is to organize the data in the dither timing data storage unit 57 to facilitate fast searching by the dither matching algorithm.

Efficiency Methods

The following sections describe methods that help the dither matching unit 56 operate faster. As noted earlier, faster operation of the dither matching algorithm and related processes allows a larger maximum finder ranking list, which increases performance.

Aged Pointer Method

Most of the data (in the receive buffer, the dither timing data, and hypothesis data) is associated with time sequences, and because of limited memory space, the oldest data needs to be discarded to provide room for newer data. For various reasons, it is helpful to organize much of the data in the form of linked lists. In these circumstances, and using conventional methods, a process called 'garbage collection' is needed. This process searches the linked lists to find the oldest data, and deletes this data from the linked lists, making the memory used for this data available for new data. But the following new data storage method eliminates the need for 'garbage collection'.

First, data of similar type (and thus similar memory size per data element) is put in a circular buffer. The data is thus stored in the sequence that it is written, and when the buffer is full, removing the oldest data element allows the sequence to continue.

A circular buffer is an array of element locations, plus a variable to indicate the next location to be written, and a variable to indicate the next location to be removed. The next location after the last location of the array is the first location of the array.

Secondly, data elements of the circular buffer are not referenced in the usual way. The circular buffer is actually an array, and the usual way is to reference an element is by its array index (n refers to the n'th element). This makes it awkward to compare the ages of elements. Consider, for example, a circular buffer of 16 elements. When the circular buffer is initially filled, the indexes of the elements, in oldest-to-newest order, is 0 1 2 3 4 5 6 7 8 9 10 11 12 13 14 15. Here, the lower index values are associated with older elements. Later, when the four oldest elements are re-used to store the four newest elements, the indexes of the elements, in oldest-to-newest order, is 4 5 6 7 8 9 10 11 12 13 14 15 0 1 2 3. Now it is more difficult to compare indexes than to compare ages.

Instead, an element is referenced by what is referred to here as a time index, and the time index is converted to an array index to access the buffer. When a new element is added to the circular buffer, it is assigned the next time index (a sequence of integers), and the time index is converted to an array index by dividing the time index by the size of the circular buffer and taking the remainder as the array index (remaindering is also called a mod operation). Initially, the time index and array index values are the same (the remainder of 3 divided by 16 is 3, for example). When the circular buffer is initially filled, and afterward the four oldest elements are re-used to store the four more new elements, then the time indexes of the elements, in oldest-to-newest order, will be 4 5 6 7 8 9 10 11 12 13 14 15 16 17 18 19, and the corresponding array indexes will be 4 5 6 7 8 9 10 11 12 13 14 15 0 1 2 3, as before.

This principle is illustrated in FIG. 9 by depicting the circular buffer as a rolling wheel. The elements of the circular buffer are labeled with the array indexes, and the 'road' on which the 'wheel' is rolling is labeled with the time indexes. In FIG. 9, the data referenced by time indexes 11, 12 . . . 26 (the 'road') are currently stored at array indexes 11, 12 . . . 15, 0, 1 . . . 10 (the 'wheel'). Rolling the wheel a bit more, it can be seen that the old data at array index 11 will be overwritten by new data referenced by time index 27.

The third part of the new scheme is that when a linked list is constructed, time indexes are used instead of pointers to reference other data. Pointers conventionally have a nil value to indicate the case that the pointer points to nothing. For example, the 'next' pointer of the last item in a singly-linked list is equal to nil, indicating that there isn't a next item. When time indexes are substituted for pointers, an old time index is substituted for a nil pointer. An old time index is one that is too old to refer to data currently in the circular buffer. In the above diagram, time indexes 10 and earlier are old. A variable called OldIdx, equal to 10, defines the meaning of 'old'.

When a new item is added to a linked list, the new item must be added to the head of the list. For example, suppose data with time indexes 19 and 11 (array indexes 3 and 11) are in a linked list. Element 19 is at the head of the list, and its 'next' 'pointer' is time index 11. The 'next' 'pointer' of element 11 is a time index value of 10 or less. If element 26 is added to the head of this list, then the 'next' 'pointer' of element 26 is time index 19.

Consider what happens when the old data at array index 11 is overwritten by new data referenced by time index 27. This causes us to re-define 'old' by incrementing OldIdx to the value of 11. With conventional methods all of the linked lists would have to be searched to find element 11, which is now old. The result would be that element 19 points to element 11. However, that is now wrong, because element 11 has been overwritten by element 27. This would have to be fixed by changing element 19 to point to nil.

But in the new scheme, pointers do not need to be found and fixed. Rather, OldIdx, is incremented and the process is complete. This process re-defines 'old', so that if, at a later time, the linked list beginning with element 26 is scanned, element 26 points to element 19, and element 19 is now the end of the list, because its 'next' 'pointer' is 'old', which is equivalent to nil.

Dither Timing Data Structure

The following describes how the dither timing data is organized in the dither timing data storage unit 57 to facilitate fast searching by the dither matching algorithm. The data structure is illustrated in FIGS. 10A and B. A cryptographic algorithm, as described earlier, provides the array of boundary times shown at the bottom of FIGS. 10A and B. These are the times that codes near the present begin, typically measured in chips, and relative to some reference point in local time. This is really the complete data, but the other data shown in the figure allows this data to be found more quickly.

The data to be matched is the difference between two boundary times. Sometimes the difference will be between two successive boundary times, which is the length of the code between these boundaries, and sometimes it will be between one boundary and another two boundaries later, which is the length of two successive codes. The first case is called a span of one, and the second case, illustrated at the bottom of FIG. 10A, is called a span of two. The data structure can be configured for any range of spans, but for purposes of the present example, FIG. 10A illustrates the structure for spans from one to two. Linked List 1 and Hash Table 1 facilitate the finding of boundary differences with a span of one, and Linked List 2 and Hash Table 2 facilitate the finding of boundary differences with a span of two.

Hash tables allow data in a large list to be found quickly. In this case, the hash function is the mod (remaindering) function. Suppose the difference T occurs twice in the array of boundary times, as illustrated. In FIG. 10A, for example, d−c=T, and b−a= T. The hash function is calculated T mod HashSize, where HashSize is the size of the hash table. Since this difference has a span of two, the hash function value is used as the index to Hash Table 2, and at that location store a 'pointer' to the column where d is found; this is the head of a linked list. To complete the list, a 'pointer' is stored in Linked List 2 in the column of d to the column of b; and to mark the end of the list, the 'pointer' in Linked List 2 in the column of b is set equal to a 'nil' value. But instead of using ordinary pointers, aged pointers are used, that is, time indexes that are converted to array indexes, as explained above, so that the dither timing data can be updated more easily.

If two correlations are received with a difference of T, then the two matching differences in the dither timing data can be found quickly. The difference is closer to two nominal code lengths than to one or three, so the span is recognized to be two. The hash function T mod HashSize is computed, which locates the initial 'pointer' in Hash Table 2. Then the chain of pointers can be followed, locating the columns of d and b. For each column found, a pseudorange can be computed, as described earlier.

The nature of the hash function is that two different values can hash to the same value; that is, there can be two different values T and T', yet T mod HashSize and T' mod HashSize may have the same value. If there is another difference f−e=T' that yields the same hash index value, it must also be included in the list, as shown in FIG. 10B.

The chain of pointers can be followed, locating the columns of f, d, and b. But when searching for the difference T, not all of the pairs found will have a difference equal to T. The left half of each pair (e, c, and a) must be also located (by using the appropriate span value), and the difference computed in each case to determine if the difference is actually T.

The dither timing data can be initialized and updated one boundary time at a time, as follows. For each boundary time, it is first added to the Boundary Times list, then paired with previous boundary times, up to the maximum span to be handled. For each new pair, the difference is computed, then the hash index is computed. Then the pair is added to the appropriate hash table and linked list. That is, the first link is replaced by two links, as can be seen by comparing FIGS. 10A and B.

Screening Function

To further reduce the computing work, the boundary differences can be checked for range (compared to minimum and maximum values) before attempting to find them in the dither timing data. This range checking is called the screening function. True boundary differences (from aligned correlators) are limited by the range of the dither variations. False boundary differences (from unaligned correlators) are often out of range, and when out of range, will never be found in the dither timing data. The minimum and maximum values depend on the span and parameters of the cryptographic function. Checking the range is a faster way to reject false data, although the true differences and a few of the false differences will be in range, and will be checked twice, first by the screening function, then by the search of the dither timing data. On average, the screening function reduces the computing work because most of the differences are false differences.

Buffer Windowing

The sequence of the correlations taken from the maximum finder 54 is approximately, but not exactly, the time-tag sequence (the sequence that the correlations were entered into the maximum finder 54). Thus, when the latest correlation taken from the maximum finder 54 and entered into the receive buffer 55 is paired with an earlier correlation in the receive buffer 55, the distance in the receive buffer 55 between the paired correlations tends to be proportional to the boundary time difference in most cases. This is especially true if the correlations are taken from the maximum finder 54 at a constant rate. Since the true boundary time differences have a limited range, taking the earlier correlation only from a corresponding limited range of the buffer (the buffer window) will obtain most of the true boundary time differences, while reducing the computing work, because less pairs are processed. This strategy approximates the screening function, and is less reliable (a few true boundary time differences are skipped), but saves more processing time.

The instinct of most programmers is to be neat, and careful not to omit anything, because many software programs are a house of cards, undone by the least omission or error. Here, however, it pays to be a little sloppy, because skipping some good data makes the software processes operate faster, which (as noted earlier) actually allows more data, including good data, to be processed.

Scoring Shortcut

The reliability of a hypothesis can be measured by the sum of the strengths of the correlations supporting that hypothesis. However, the maximum finder 54 finds the strongest hypotheses—a few out of many more hypotheses—so it can be argued that those found are all nearly equally strong. Accordingly, counting the number of correlations that support a hypothesis will provide nearly as good a measure of the reliability of a hypothesis as summing the strengths.

This will save processing time, because it is faster to count the correlations that support a hypothesis than it is to compute the sum of the strengths of the correlations. The correlation strengths are needed by the maximum finder 54 hardware (for sorting), but in this embodiment of the invention the strength data will not be read from the maximum finder 54 and entered into the receive buffer 55. Rather, the receive buffer 55 will store only time tags, and only the time tags, not the correlation strengths, will be processed thereafter.

Hypothesis Merging

As stated earlier, the hypothesis data buffer is searched each time a hypothesis created, to find if there are other hypotheses with the same or a similar premise. The scores of the agreeing hypotheses are then combined, because the combined evidence supports the same conclusion. The best combined score is used to select the final result (e.g., the pseudorange estimate).

When an agreeing hypothesis is found, it is better to merge the two hypotheses into one, making the data more compact and simplifying the work, rather than creating a new hypothesis and placing it into the hypothesis data buffer. The merged hypothesis replaces, or updates, the hypothesis already in the hypothesis data buffer, and merging the two eliminates the work of creating a new hypothesis. In this embodiment of the invention a new hypothesis is put into the hypothesis data buffer only when an agreeing hypothesis is not found.

However, the hypotheses are merged only when the premises agree exactly, else information will be lost. Thus, the hypothesis data buffer is searched for a hypothesis with exactly the same premise. Here, there will be no more than one found, because of the merging. After creating or replacing a hypothesis (as described next), the hypothesis data buffer 59 is then searched for hypotheses with a premise one more or one less than the current premise. The scores of these nearby hypotheses are summed, and this sum competes with other sums of this kind for the status of best combined score. Whenever a better combined score is found (the best combined score is updated), a pointer to the associated middle hypothesis (current hypothesis) is saved. When the best combined score exceeds some threshold, the dither matching algorithm selects that hypothesis as the final result. Also, the nearby hypotheses can be used to estimate a Doppler correction.

Earlier, it was indicated that the hypothesis data may include evidence data describing the correlations that support the hypothesis, but the evidence data was not described. The evidence data of the present embodiment is now described in detail.

To avoid counting a correlation twice when merging hypotheses, the hypothesis data must include an identification of at least the last two supporting correlations. These correlation identifiers are called Evidence1 (82) and Evidence2 (83), as shown in FIG. 8, and Evidence1 identifies the earlier correlation. The correlations can be identified by the boundary time (time tag) or by the time index used with the receive buffer 55. In either case, Evidence1 of the new hypothesis needs to be compared with Evidence1 and Evidence2 of the older hypothesis. If a match is found, the score is reduced by one. Evidence2 of the merged hypothesis will be Evidence2 of the new hypothesis, and Evidence1 of the merged hypothesis will be the latest of the remaining evidence.

In some applications, the nearby hypotheses and the evidence data can be used to estimate a Doppler correction. In this case, keeping the time tag or time index of the earliest correlation (as evidence data) as well as of the latest correlation may be useful.

Hypothesis Procedures

The following procedures are examples of program flows for matching and merging hypotheses, according to one aspect of the invention.

The procedures for handling hypotheses use the following data. The names designate parts of memory where the data is stored.
  HashSize: (a constant integer) the size of the hash list
  BufferSize: (a constant integer) the size of the hypothesis buffer
  NewIndex: (a variable integer) locates the newest hypothesis in the buffer (initially zero)
  OldIndex: (a variable integer) locates the oldest hypothesis in the buffer (initially zero)
  HashList: a list of buffer indexes, not necessarily full
  Buffer: a list of hypotheses, not necessarily full
Each hypothesis in the buffer has three components:
  Premise: In some applications, this may have components such as time premise and Doppler premise, but for the purposes of illustration, Premise here is simply an integer. For the application of detecting a known dither pattern, the Premise data needs to be adapted to specify a difference in the times of arrival of two codes.
  Strength: a correlation sum (the strength of the correlation is the strength of evidence for the premise.) Alternatively, the number of times that the given premise has been matched can be counted.
  Link: an index to refer to another hypothesis, a chain of such references forms a linked list; a too-old index indicates no reference (end of the chain).
Notation for indicating data structures is illustrated by the following examples:
  HashList[HashIndex] indicates the item at index position HashIndex in the list called HashList.
  Buffer[BufferIndex].Premise indicates the Premise component of the item at index position BufferIndex in the list called Buffer.
Procedural statements are illustrated by the following examples:
  "Index=Buffer[BufferIndex].Link" means that the value of the data expressed to the right of the equal sign will be copied to the data expressed to the left of the equal sign. In this example, the current value of Buffer[BufferIndex].Link will become the new value of Index.
  Statement groupings having the form "If condition then do this . . . (end of Then)" indicate that one or more statements are to be done only when a certain condition is true. Such a grouping of statements can be extended by language of the form "else do this . . . (end of Else)", to indicate other statements to do when the condition is false.

Statement groupings having the form "While condition do this . . . (end of While)" indicate one or more statements are to be done while a certain condition is true, generally repeatedly. The condition is tested before doing the statements; if true, do the statements and go back to re-test the condition. If the condition is initially false, nothing is done. On the other hand, if the condition is always true, the statements will be repeated forever.

Statement groupings having the form "Repeat this until condition . . . (end of Repeat)" indicate one or more statements are to be repeated until a certain condition is true. The condition is tested after doing the statements; if true, go back to do the statements again. If the condition is initially false, the statements will be done only once. On the other hand, if the condition is always true, the statements will be repeated forever.

The "end of" notations in the above statement groupings are meant to clarify the extent of the statements to which some condition applies. The indentation also helps. Generally there are statements inside of a "While" or "Repeat" loop that will change the specified condition.

These procedures frequently use modular arithmetic. The value of the expression "integer1 modulo integer2" is the remainder from dividing integer1 by integer2. For example, 17 modulo 5 is equal to 2. For the special case that integer2 is a power of two, a faster implementation can generally be obtained by substituting the expression "integer1 and (integer2−1)", where and refers to a bit-wise logical operation.

When a procedure is defined the definition begins with a description of the procedure's interface (how it can be referenced by other procedures) and the temporary data that it uses. The statements that define what the procedure does are included between "Procedure begins here" and "(end of procedure)". The execution of the procedure does not always end at the end of the definition of the procedure. Execution of the procedure will also end when the statement "Quit this procedure" is encountered.

Notes may follow the procedure definition to explain some features.

The following is an example of a procedure to find a hypothesis in the buffer that has a given premise Given-Premise (or to find out that there is none):

Interface:
   Name of procedure: FindHypothesis
   Input: GivenPremise, a premise (an integer?)
   Output: Index, an integer
Temporary data used:
   HashIndex, an integer
   BufferIndex, an integer
Procedure begins here:
HashIndex=GivenPremise modulo HashSize (see note 1)
Index=HashList[HashIndex]
While Index is greater than OldIndex, do this: (see note 2)
   BufferIndex=Index modulo BufferSize
   If Buffer[BufferIndex].Premise=GivenPremise
   Then
     Note that we have found a matching hypothesis.
     (Index indicates where it is found.)
     Quit this procedure
   (end of Then)
   Index=Buffer[BufferIndex].Link
(end of While)
Note that no matching hypothesis was found. Indicate by Index=0.
(end of procedure)

Note 1: Hashing is a method for accelerating a search process. When GivenPremise is not a simple integer, a more complex method of computing the HashIndex may be needed, such as "HashIndex=(TimePremise xor DopplerPremise) modulo HashSize". In any case, the result must fall within the range of zero to HashSize−1.

Note 2: In this "while" loop modulo indexes are used instead of pointers to link the items of the list. The condition "Index is greater than OldIndex" means that the index is not too old. The opposite condition is that the index is too old. The conventional way to mark the end of a linked list is with a "nil" pointer that points to nothing. However, here the end of a linked list is marked with a too-old pointer.

The following is an example of a procedure to insert a new hypothesis (with components NewPremise and NewStrength) into the hypothesis buffer, updating the hash list and other data accordingly. When the buffer is full, the new hypothesis cannot be immediately inserted into the hypothesis buffer. A place to insert it must be found, preferably where it can replace a weaker hypothesis. There is also a tendency to replace older hypotheses. While trying to find a weaker hypothesis, those that are stronger are "renewed." The "renewal" process changes the indexes so that the oldest hypothesis becomes identified as the newest hypothesis. This tends to keep the strongest hypotheses (those most likely to be correct) in the buffer, while "weeding out" the weaker ones.

Interface:
   Name of procedure: AddNewHypothesis
   Inputs:
     NewPremise, a premise (an integer?)
     NewStrength, an integer
   Output: Index, an integer
Temporary data used:
   Renewals, an integer
   HashIndex, an integer
   BufferIndex, an integer
   RenewIt, either true or false
Procedure begins here:
Add 1 to NewIndex
If NewIndex − OldIndex is greater than BufferSize (that is, if the buffer is full)
Then do this:
   Add 1 to OldIndex (see note 1)
   Renewals = 0
   Repeat this until not RenewIt -continued

```
        BufferIndex = OldIndex modulo BufferSize
        RenewIt = "Buffer[BufferIndex].Strength greater than NewStrength?"
        If RenewIt
        Then do this:
            Add 1 to Renewals
            HashIndex = Buffer[BufferIndex].Premise modulo HashSize
            (see note 2)
            Buffer[BufferIndex].Link = HashList[HashIndex]
            HashList[HashIndex] = NewIndex
            If Renewals equals or exceeds MaxRenewals (see note 3)
            Then do this:
                (Note that the new hypothesis was not added.) Index = 0
                Quit this procedure.
            (end of Then)
            Add 1 to NewIndex (go try another hypothesis)
            Add 1 to OldIndex
        (end of Then)
    (end of Repeat; test "until" condition here)
    (To get here, NewStrength must be equal to or greater than
    Buffer[BufferIndex].Strength.)
(end of Then)
(Here is the basic part of the procedure)
BufferIndex = NewIndex modulo BufferSize
HashIndex = NewPremise modulo HashSize
Buffer[BufferIndex].Link = HashList[HashIndex] (see note 4)
HashList[HashIndex] = NewIndex
Buffer[BufferIndex].Premise = NewPremise
Buffer[BufferIndex].Strength = NewStrength
(Note that the new hypothesis was added.) Index = NewIndex
(Its location is given by NewIndex.)
(end of procedure)
```

Note 1: Every time that a I is added to OldIndex, we effectively discard an old hypothesis by defining it to be too old. Because too-old indexes are functionally equivalent to nil pointers, the too-old hypothesis is also declared to be non-existent. The memory space thus freed is available to be used for new data. At this point, NewIndex−OldIndex=BufferSize, so that both NewIndex and OldIndex refer to the same hypothesis memory space.

Many conventional memory allocation systems for linked lists need time-consuming "garbage disposal" procedures to free up the memory space allocated to old data, so that it can be re-used. Using such conventional methods, the pointers that point to the old hypothesis would have to be found, and changed so that the old hypothesis is deleted from any linked lists. But here, all that is done is add 1 to OldIndex. The indexes that "point" to the old hypothesis do not have to be found and changed to make them old. They are just re-defined "old".

It is noted that the linked lists used here are arranged so that the oldest data in a linked list is always at the end of the list. This technique works because to remove an item from the end of a linked list, it is only necessary to change the pointer to that item to nil (or equivalently, redefine the pointer as too-old). This technique, however, does not work for items in the middle of a linked list.

Another limitation of this technique applies because NewIndex and OldIndex are continually incremented, and can eventually become too large for the memory size (and/or register size) used to store and operate on these integers. However, such an acquisition search is unlikely to go on indefinitely. If a comfortable limit is set on the acquisition search time, how large these integers need to be can be calculated. It takes only one more bit to double the time limit.

Note 2: Since NewIndex and OldIndex refer to the same hypothesis memory space, the hypothesis data does not need to be copied or moved to renew it. The links just need to be changed to reposition the hypothesis from the end of the linked list to the beginning of it.

Note 3: A limit is placed on the number of renewals to minimize the time spent looking for a place for the new data. If it is hard to find a weaker hypothesis for the new hypothesis to replace, the new hypothesis is probably too weak, and no more time should be wasted on it.

Note 4: The usual method for adding a new item to the beginning of a linked list is to make the new item point to the current list, and then make the initial list pointer (HashList[Hashindex]) point to the new item.

The following is an example of a procedure to process a new hypothesis (with components NewPremise and NewStrength), using the above procedures:

```
Interface:
    Name of procedure: ProcessNewHypothesis
    Inputs:
        NewPremise, a premise (an integer?)
        NewStrength, an integer
    Output: none
Temporary data used:
    Index, an integer
    BufferIndex, an integer
Procedure begins here:
    Do FindHypothesis procedure, using
        Inputs: NewPremise, NewStrength
        Output: Index
    If Index equals zero (that is, no matching premise found)
    Then do this: (see note 1)
        Do AddNewHypothesis procedure, using
            Inputs: NewPremise, NewStrength
            Output: Index
    (end of Then)
    Else do this: (see note 2)
        BufferIndex = Index modulo BufferSize
        Add NewStrength to Buffer[BufferIndex].Strength
```

-continued

```
    (end of Else)
    If Index is not zero (that is, either a matching premise is found, or
    one is added)
    Then do this:
        Evaluate the hypothesis at Index (see note below)
    (end of Then)
(end of procedure)
```

Note 1: If a hypothesis with a matching premise cannot be found, an attempt is made to insert the new hypothesis into the hypothesis buffer. The index will be set to zero if the attempt fails.

Note 2: If a hypothesis with a matching premise is found, the new hypothesis is "merged" with the one that was found by adding the new strength to the old strength. The evidence for this premise is now stronger. This commonly happens for the correct premise, and rarely happens for incorrect premises.

If the correct data is thought of as truth-tellers and the incorrect data as liars, it gives an intuitive idea of how the system works. The liars have the advantage of being more numerous, but the disadvantage of generally disagreeing. The truth-tellers always agree, and if enough of them are found, their combined strength allows the truth to finally be recognizable.

The following is a summary of an exemplary hypothesis evaluation. The hypothesis evaluation should update data variables called BestStrength and Runnerup, such that BestStrength will be equal to the highest strength observed so far, and such that Runnerup will be the second-highest strength observed so far. The hypothesis evaluation procedure also updates a variable BestPremise, which is the premise associated with BestStrength. The procedure also has a constant called Threshold. When BestStrength divided by Runnerup exceeds Threshold, it is decided that BestPremise is the truth. (At this point, Runnerup represents the most convincing of the liars.) For any given system, one can experimentally find a good value for Threshold. It should be high enough that the system nearly always finds the truth, but not so high that it takes longer than necessary to reach a decision.

APPLICATIONS

The present invention has broad applications, such as, for example, signaling systems intended to locate vehicles, targets, etc. while resisting interfering signals and while preventing unauthorized receivers from using the location signals. The same methods can be employed to provide timing for the purpose of synchronizing messages or other signals, while resisting interfering signals and while preventing unauthorized receivers from discovering the intended timing. The invention is not limited to those mentioned above, and can be used in other applications not mentioned here, as will be understood by persons skilled in the art.

Having described preferred embodiments of methods and apparatuses for generating and detecting a non-stationary dither code, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method for detecting a long code composed of dithered short codes, the method comprising:
   correlating a received signal with a reference code to produce correlation sums;
   detecting, based on the correlation sums, first and second codes among the dithered codes;
   determining a predetermined pattern based on the detected first and second codes, including determining a measured code interval by calculating a difference between a boundary of the first and second codes, comparing the measured code interval with a predetermined code interval among a plurality of predetermined code intervals, and indicating a match if the measured code interval is substantially equal to the predetermined code interval; and
   determining a phase of the long code based on the determined predetermined pattern, including recording in a hypothesis storage unit information relating to the match, the hypothesis storage unit including a premise storage area and a score storage area, and recording the measured code interval in the hypothesis storage area, and recording an indication of the veracity of measured code interval in the score storage area.

2. The method of claim 1, wherein the dithered short codes are dithered according to a non-stationary dither pattern.

3. The method of claim 1, wherein the dithered short codes are dithered according to a non-repeating pattern.

4. The method of claim 1, wherein the predetermined pattern is a secret dither pattern for use only by authorized receivers.

5. The method of claim 1, wherein the determining a phase of the long code includes searching for a hypothesis storage unit having a premise storage area having recorded therein a premise matching the measured code interval, and if a premise matches the measured code interval, updating a score storage area of the hypothesis indicating the match.

6. The method of claim 5, wherein the score storage area is updated by adding a correlation sum corresponding to the first and second codes to a correlation sum previously recorded in the score storage area.

7. The method of claim 5, wherein the score storage area is updated by incrementing a value previously recorded in the score storage area.

8. The method of claim 1, wherein said determining a predetermined pattern includes locating a first pointer in a pattern finding data structure based on the measured code interval, reading a first predetermined code interval from a memory location indicated by the first pointer, and comparing the measured code interval with the first predetermined code interval.

9. The method of claim 8, wherein said determining a predetermined pattern further includes reading a second predetermined code interval from a memory location indicated by a second pointer stored in association with the first predeteremined code interval, and comparing the measured code interval with the second predetermined code interval.

10. The method of claim 8, wherein the pattern finding data structure is a hash table.

11. A code detector receiving a signal having a long code, comprising:
    a correlation unit correlating the received signal with a reference code, and outputting a plurality of correlation sums;

a dither timing data unit storing predetermined data corresponding to a dither code;

a hypothesis data unit storing a plurality of hypothesis, wherein each hypothesis comprises a premise, evidence and a score; and a dither matching unit determining an interval between two of the plurality of correlation sums, matching the determined interval with an interval in the dither timing data unit, determining the premise based on the match, locating a hypothesis in the hypothesis data unit based on the determined premise, revising the score of the hypothesis based on the match, and outputting data from the hypothesis if the score meets a threshold.

12. The code detector of claim 11, wherein the long code is composed of short codes dithered according to a non-stationary dither pattern.

13. The code detector of claim 12, wherein the dithered short codes are dithered according to a non-repeating pattern.

14. The code detector of claim 10, wherein the predetermined data is a secret dither pattern for use only by authorized receivers.

15. A method for detecting a long code composed of dithered short codes, the method comprising:

correlating a received signal with a reference code to produce correlation sums;

detecting, based on the correlation sums, first and second codes among the dithered codes;

determining a predetermined pattern based on the detected first and second codes, including locating a first pointer in a pattern finding data structure based on the measured code interval, reading a first predetermined code interval from a memory location indicated by the first pointer, and comparing the measured code interval with the first predetermined code interval; and determining a phase of the long code based on the determined predetermined pattern.

16. The method of claim 15, wherein the dithered short codes are dithered according to a non-stationary dither pattern.

17. The method of claim 15, wherein the dithered short codes are dithered according to a non-repeating pattern.

18. The method of claim 15, wherein the predetermined pattern is a secret dither pattern for use only by authorized receivers.

19. The method of claim 15, wherein the determining a predetermined pattern includes determining a measured code interval by calculating a difference between a boundary of the first and second codes, comparing the measured code interval with a predetermined code interval among a plurality of predetermined code intervals, and indicating a match if the measured code interval is substantially equal to the predetermined code interval.

20. The method of claim 19, wherein the determining a phase of the long code includes recording in a hypothesis storage unit information relating to the match, the hypothesis storage unit including a premise storage area and a score storage area, and recording the measured code interval in the hypothesis storage area, and recording an indication of the veracity of measured code interval in the score storage area.

21. The method of claim 19, wherein the determining a phase of the long code includes searching for a hypothesis storage unit having a premise storage area having recorded therein a premise matching the measured code interval, and if a premise matches the measured code interval, updating a score storage area of the hypothesis indicating the match.

22. The method of claim 21, wherein the score storage area is updated by adding a correlation sum corresponding to the first and second codes to a correlation sum previously recorded in the score storage area.

23. The method of claim 21, wherein the score storage area is updated by incrementing a value previously recorded in the score storage area.

24. The method of claim 15, wherein the determining a predetermined pattern further includes reading a second predetermined code interval from a memory location indicated by a second pointer stored in association with the first predetermined code interval, and comparing the measured code interval with the second predetermined code interval.

25. The method of claim 15, wherein the pattern finding data structure is a hash table.

26. A method for detecting a long code composed of dithered short codes, the method comprising:

correlating a received signal with a reference code to produce correlation sums;

detecting, based on the correlation sums, first and second codes among the dithered codes;

determining a predetermined pattern based on the detected first and second codes, including determining a measured code interval by calculating a difference between a boundary of the first and second codes, comparing the measured code interval with a predetermined code interval among a plurality of predetermined code intervals, and indicating a match if the measured code interval is substantially equal to the predetermined code interval; and determining a phase of the long code based on the determined predetermined pattern, including searching for a hypothesis storage unit having a premise storage area having recorded therein a premise matching the measured code interval, and if a premise matches the measured code interval, updating a score storage area of the hypothesis indicating the match.

27. The method of claim 26, wherein the dithered short codes are dithered according to a non-stationary dither pattern.

28. The method of claim 26, wherein the dithered short codes are dithered according to a non-repeating pattern.

29. The method of claim 26, wherein the predetermined pattern is a secret dither pattern for use only by authorized receivers.

30. The method of claim 26, wherein the determining a phase of the long code includes recording in a hypothesis storage unit information relating to the match, the hypothesis storage unit including a premise storage area and a score storage area, and recording the measured code interval in the hypothesis storage area, and recording an indication of the veracity of measured code interval in the score storage area.

31. The method of claim 30, wherein the score storage area is updated by adding a correlation sum corresponding to the first and second codes to a correlation sum previously recorded in the score storage area.

32. The method of claim 30, wherein the score storage area is updated by incrementing a value previously recorded in the score storage area.

33. The method of claim 26, wherein the determining a predetermined pattern includes locating a first pointer in a pattern finding data structure based on the measured code interval, reading a first predetermined code interval from a memory location indicated by the first pointer, and comparing the measured code interval with the first predetermined code interval.

34. The method of claim 26, wherein the determining a predetermined pattern further includes reading a second predetermined code interval from a memory location indicated by a second pointer stored in association with the first predetermined code interval, and comparing the measured code interval with the second predetermined code interval.

35. The method of claim 26, wherein the pattern finding data structure is a hash table.

* * * * *